United States Patent [19]

Smith

[11] 4,287,441
[45] Sep. 1, 1981

[54] CORRELATED DOUBLE SAMPLING CCD VIDEO PREPROCESSOR-AMPLIFIER

[75] Inventor: Edwyn D. Smith, Tucson, Ariz.

[73] Assignee: The United States of America as represented by the Secretary of the Army, Washington, D.C.

[21] Appl. No.: 25,506

[22] Filed: Mar. 30, 1979

[51] Int. Cl.³ ............................................. G11C 27/02
[52] U.S. Cl. ............................... 307/353; 307/221 D; 357/24
[58] Field of Search .................. 307/221 D, 352, 353, 307/237; 328/151, 162, 163; 357/24; 328/165

[56] References Cited

U.S. PATENT DOCUMENTS

| | | | |
|---|---|---|---|
| 3,781,574 | 12/1973 | White et al. | 307/353 X |
| 3,820,033 | 6/1974 | Iwata | 307/353 |
| 3,965,368 | 6/1976 | Emmons | 307/221 D |
| 4,156,818 | 5/1979 | Collins et al. | 307/353 X |
| 4,159,432 | 6/1979 | Burke et al. | 307/353 X |

*Primary Examiner*—John Zazworsky
*Attorney, Agent, or Firm*—Nathan Edelberg; Milton W. Lee; John E. Holford

[57] ABSTRACT

The invention provides a preprocessor using sample-and-hold circuits and amplifiers which performs double correlated sampling of the output of a CCD with full efficiency at rates up to those at which these elements can perform individually.

6 Claims, 8 Drawing Figures

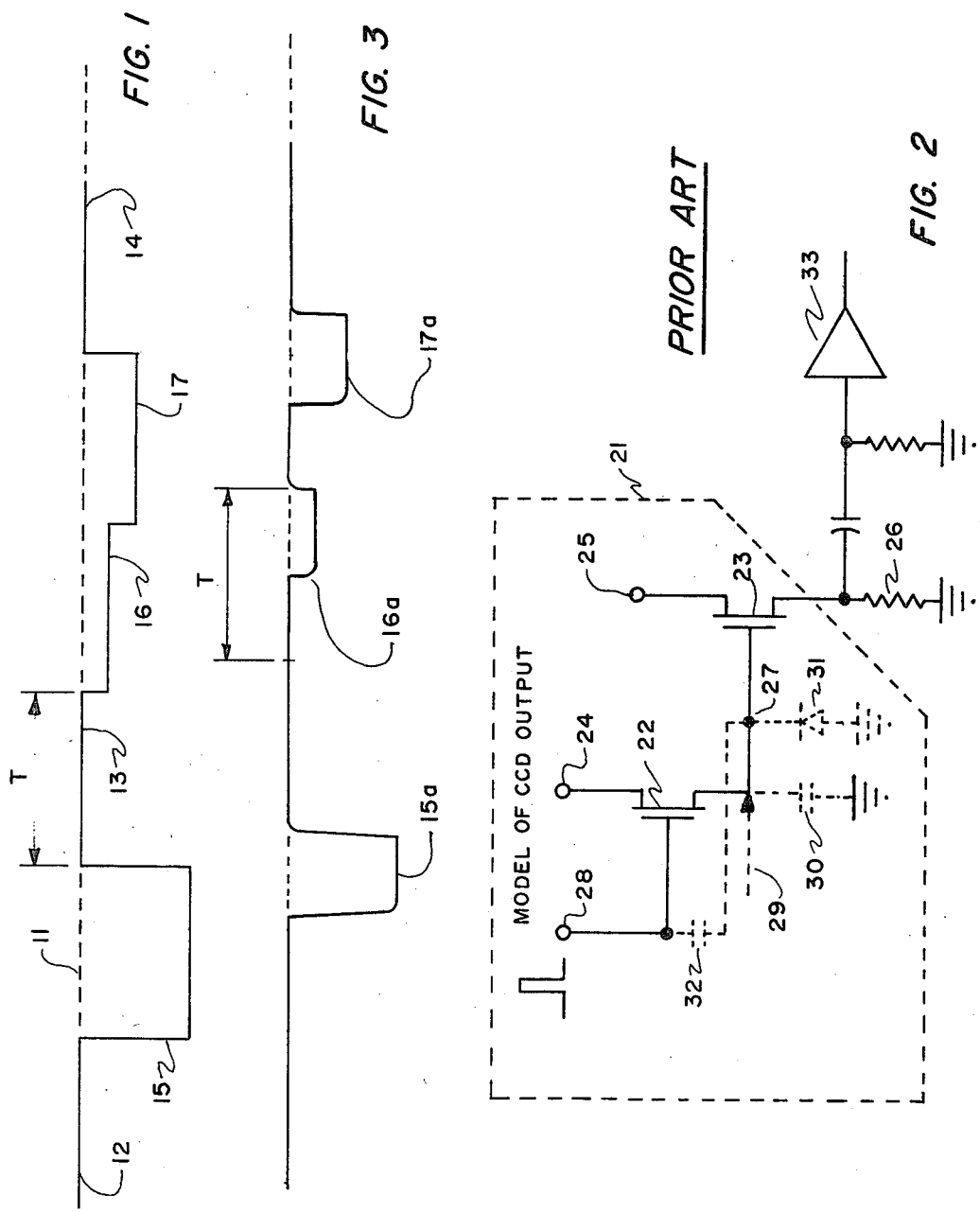

CORRELATED DOUBLE SAMPLING CCD VIDEO PREPROCESSOR-AMPLIFIER

The invention described herein may be manufactured, used, and licensed by the U.S. Government for governmental purposes without the payment of any royalties thereon.

BACKGROUND OF THE INVENTION

The present invention grew out of work on an Electron-Barbarded-Semiconductor (EBS) type of Charge-Coupled-Device (CCD) being developed for a special TV camera. As well known in the art, a CCD first creates a record of each pixel in the TV image as a packet of isolated charge. The entire image may be created at once or on a line-by-line basis, but the same net result is usually obtained; the packets are delivered in normal TV sequence to an output circuit to form a video or z type modulation signal. This process is controlled by multiphase clocking pulses operating at rates many times the x and y synchronizing signals used in ordinary television.

In a CCD with good resolution and adequate picture size the output pulse rate approaches 8 Mhz. Switching at these frequencies produces transient pulses and other distortions which interfere with the smooth integration and amplification of the pixel information pulses in subsequent amplifying stages.

BRIEF DESCRIPTION OF THE INVENTION

It is an object of the present to provide a preprocessing circuit which eliminates the objectionable pulses produced by the switching devices on the CCD and stretches the pixel information pulses into a smooth video waveform. It is a further object to provide this circuit using only amplifiers and sample-and-hold type circuits operating simultaneously at the pixel frequency to maximize the sampling rate.

BRIEF DESCRIPTION OF THE DRAWINGS

The invention is best understood with reference to the attached drawings wherein:

FIG. 1 shows the "Boxcar" shape pulses that would be produced by an ideal CCD;

FIG. 2 shows an elementary gated integrator CCD output circuit;

FIG. 3 shows the waveshape produced by an idealized gated integrator CCD output circuit;

DESCRIPTION OF THE INVENTION

Figure 4:
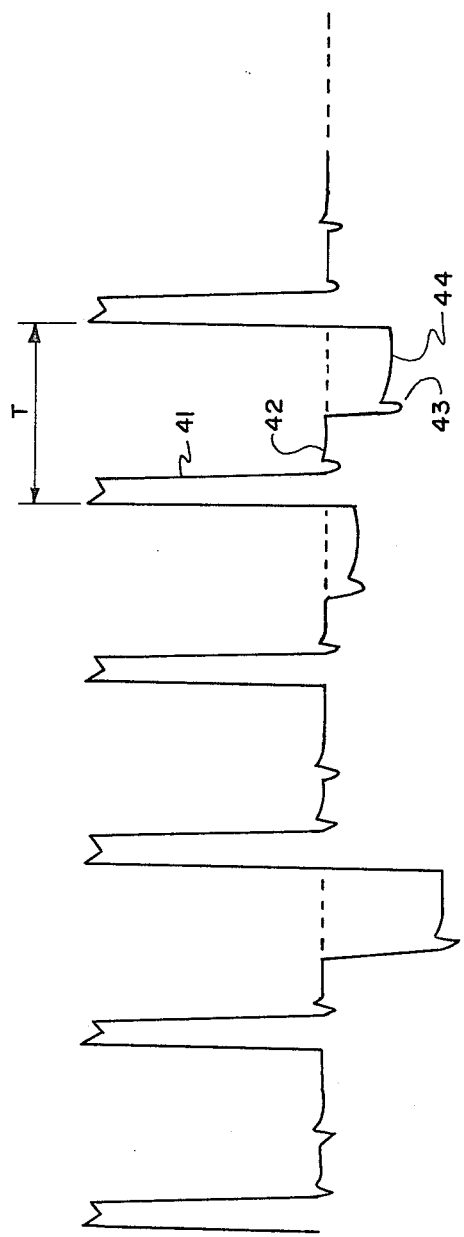
FIG. 4 shows the waveshape produced by a state of the art gated integrator CCD output circuit.

The invention relates to preprocessing circuits and their associated amplifiers as they relate to Charge-Coupled-Devices (CCD). CCDs are a class of devices which store analog signals as a series of discrete packets of charge stored and transported along the interface of an insulator and the semiconductor wherein they are created. The universal mode of readout requires the charge packets to be delivered one at a time to an output circuit. An ideal output circuit would produce a train of so-called "boxcar" waveshape pulses of period T and based on a reference level 11 as depicted and explained in FIG. 1. The pulses abut one another without overlaps. A zero charge pulse such a pulse 12, 13 and 14 would thus remain at the reference level. The largest pulse 15 would be determined by a saturation level imposed by the dimensions and materials of the CCD structure. The majority of pulses in a useful operating condition would lie between these extremes like pulses 16 and 17 to form a staircase waveform between zero pulses. Amplifying such a waveform with predictably accurate duplication of form would be a relatively simple task. The waveform obtained from a practical CCD device is quite another story.

FIG. 2 shows a typical output circuit 21 for a CCD. There may be only one or a large number of these circuits depending on whether the charge packets are delivered in a completely serial fashion or in a series-parallel manner. The output circuit is composed of two field effect transistors 22 and 23. The drain terminals 24 and 25 of both are connected to positive voltages the source electrode of the latter being connected to ground through resistor 26 to form a source follower. The source of the former is connected to the gate of the latter to provide a detector node 27. The gate electrode of the former or switching transistor is coupled to an external source of clock pulses (not shown) which are required by all CCD's and which occur between deliveries of charge packets of the detector node as indicated by dotted arrow 29. When the clock pulse is present both transistors are turned on and the node 27 is set at a level determined by the drain voltage of the switching transistor. The equivalent electrical circuit of the node is represented by the dotted capacitor 30 and back biased diode 31 which acts as a source of leakage current, usually negligible. A lumped capacity 32 also exists between the terminal 28 and the detector node which permits unwanted transients from the clock pulses to couple therebetween. The output signal across resistor 26 feeds the input of a wideband unity gain capacitively coupled buffer/driver 33 which isolates the CCD from subsequent signal processing devices.

The waveforms produced by practical versions of this circuit differ considerably in detail, but all contain certain characteristic features. A two step operational sequence is executed each time a charge packet is read out. First, the reset transistor switch 22 is turned on then off; this action resets (or presets) the detector node 27 to a reference potential. Second a packet of changes is shifted into the detector node. The node potential charges in proportion to the quantity of charge received. The output from the source follower reproduces the changes at the detector node. For comparison, the waveshape produced by an idealized gated integrator is shown in FIG. 3. A subtle but important relationship exists between the waveforms of FIG. 1 and FIG. 3. For equal video step size, the real video content pulses 15-17 of the waveform of FIG. 3 is less than half of waveform FIG. 1. Corresponding portions of the waveform in FIG. 3 are indicated by the same number as in FIG. 1 followed by the suffix "a". In practice, a capacitively coupled portion of the drive pulse applied to the gate of the reset transistor invariably appears in the output. In some designs as normally operated, other capacitively coupled pulses or transients may also appear. The two-step-per-cycle feature is fundamental to any gated integrator; whereas, the presence of capacitively coupled pulses is unintended but unavoidable.

A waveform representative of a practical gated integrator is drawn in FIG. 4. Each basic period T consists of a reset transient pulse 41, followed by an interval 42 during which no video is present and the output settles to the reference level, followed by a shift transient 43, followed by an interval 44 during which the video is subtracted from the reference level. The waveform may be considered a corrupted and noisy version of that depicted in FIG. 3 which, in turn, may be considered the best available practical approximation to the ideal, FIG. 1.

Three distinct types of noise are incorporated into such a signal. A noise fluctuation in the reference level remains constant during a period no matter whether the video is subtracted or not. This type noise is said to exhibit perfect correlation between the reference level and the video step of a period. Such noise originates within the gated integrator and is commonly called reset noise. Noise fluctuations in the video steps only not affecting the reference levels are said to be uncorrelated. The third type noise is nonconstant within a period. Two successive time samples, within a period or not, are correlated. The degree of correlation depends upon the spacing between samples and the statistics (autocorrelation function) of that particular component of the noise. In principle, any technique whereby the exact difference only between the reference level and the video step within a period is obtained and processed, the absolute values being discarded, will eliminate completely all perfectly correlated noise. Continuous noise is reduced significantly, also. It turns out the total noise reduction possible makes such schemes attractive. The original implementation of the technique was called, "correlated double sampling." Applicant has adopted the name and applied it to another implementation that achieves the same result. For reasons that lie outside the scope of this discussion, electronic circuit techniques are needed that perform correlated double sampling as an integral part of the signal processing that alters the waveform of FIG. 4 to one approximating that of FIG. 1.

Figure 5:
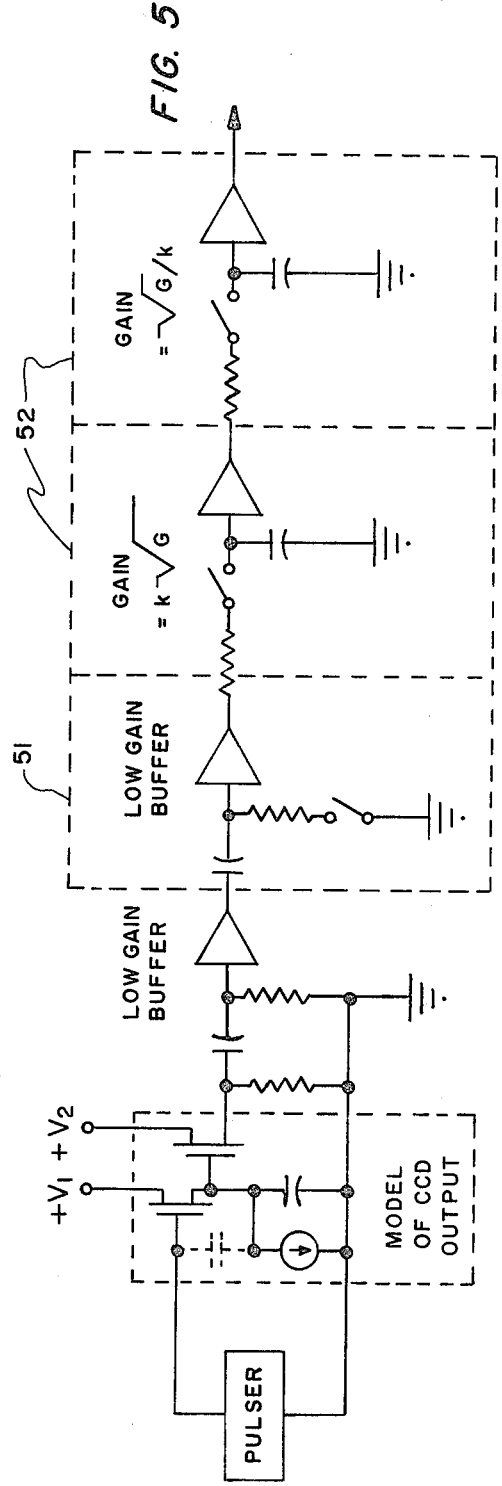
FIG. 5 shows a standard prior art preprocessor using a sample-and-hold circuit.

The conventional implementation of correlated double sampling is shown in FIG. 5. The circuit employs a switched clamp 51 followed by a two stage sample and hold 52. The technique was first applied to CCDs by a working group at Westinghouse Electric Corporation.

M. H. White, D. R. Lampe, F. C. Blaha, and I. A. Mack, "Characterization of Surface Channels CCD Image Arrays at Low Light Levels," IEEE J. Solid State Circuits, Vol. SC-9, pp. 1–13 Feb. 1974.

Applications requiring the signal-to-noise benefits of correlated double sampling typically also require large amplifier gains. The individual gains in FIG. 5 are indicated above each amplifier G being the total gain and K indicating some optimal allotment of gain between the two amplifiers. Briefly, it is good engineering practice to provide first all or most of the necessary gain with an AC coupled amplifier, then perform correlated double sampling; the final processing is readily implemented as a direct coupled system. The recommended procedure fails with a waveform as that of FIG. 4 because the capacitively coupled reset pulses saturate the amplifier and cause overload distortion. The approach of FIG. 5 will suffer from the drift problem typical of high gain direct coupled amplifiers and requires one of the available remedies.

Figure 6:
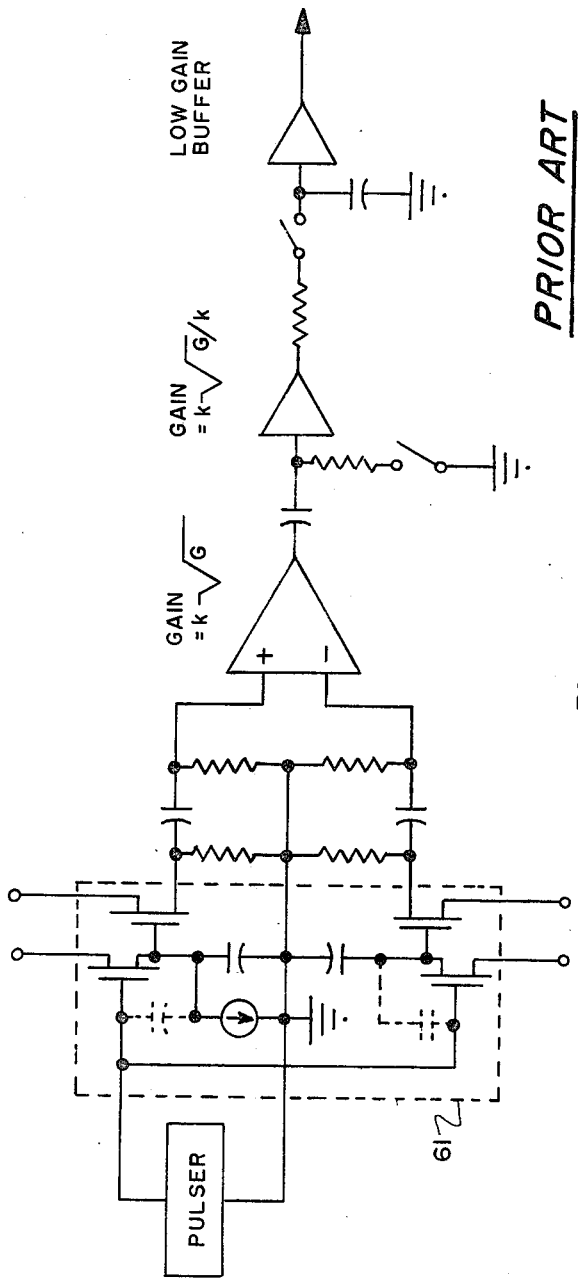
FIG. 6 shows the circuit of FIG. 5 applied to a CCD having a special matched dummy output.

FIG. 6 shows a similar prior art circuit wherein the CCD structure has been modified with a second transistor pair 61 to provide input signals for a differential amplifier. The common-mode cancellation of unwanted pulses proposed in FIG. 6 has not worked well in practice. It is not sufficient that balanced pulses, if indeed they truly are balanced, be available on the primary sensor. The twin signal paths must remain balanced also as regards impedance level, coupling to parasitic energy storages, shielding, induced interference, etc. It is also pointed out that this approach only applies to CCDs having such outputs.

Figure 7:
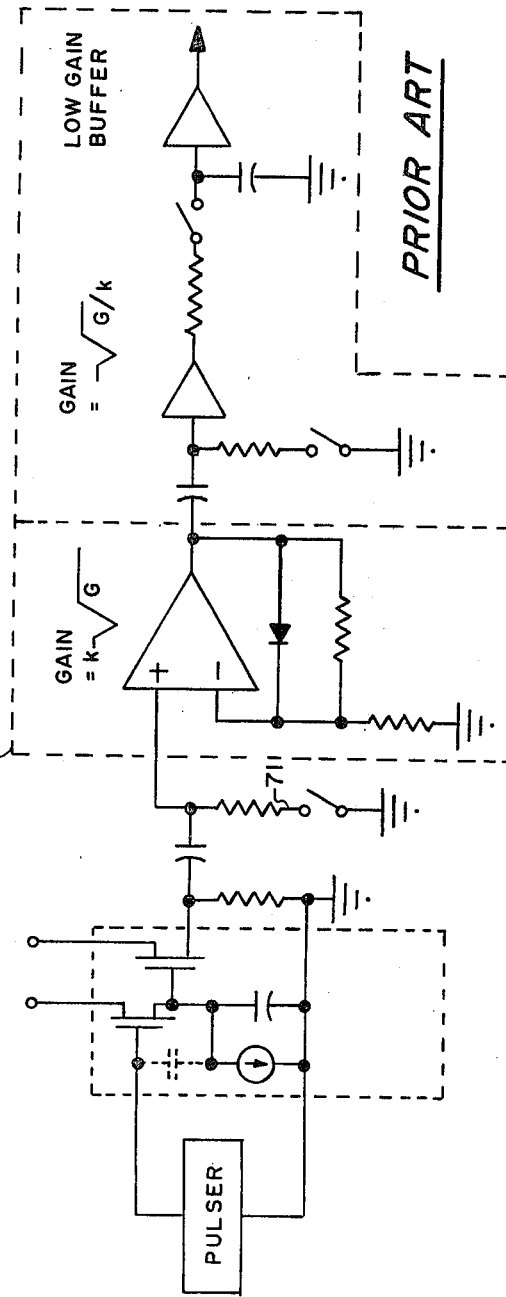
FIG. 7 shows a prior art preprocessor using an input clamp and single sided limiter.

FIG. 7 shows another approach to the problem of the capacitively coupled pulses which is described in the paper:

Scinicariello, Frank, "Low-Noise Video Amplifiers for Imaging CCDs" Proc. of the Conference on Charge-Coupled Device Technology and Applications, pp. 83–88, Washington, D. C. Nov. 30-Dec. 2, 1976. The circuit features an input clamp 71 followed by a single sided limiter 72. The knee of the limiter characteristic will occur around 0.6 volt. This value is too large to permit much subsequent amplification. The design of a differential amplifier-limiter, as suggested, capable of voltage gains greater than one hundred and able to drive a clamp circuit being switched at rates up to 8.0 Mhz all with satisfactory linearity and freedom from distortion remains to be demonstrated. Many variations on this theme are possible; they are outside the scope of the present discussion. If driven at pixel rate, the input clamp is likely to cause the same problem with amplified switching "glitches" as that of FIG. 5; if driven at line rate or slower, great care must be exercised to prevent droop. Any droop will be amplified by the full gain of the system.

All clamp-then-sample implementations of correlated double sampling are limited in speed by the requirement for two switching operations per basic period. Performance suffers if the resulting transients are not allowed to proceed to completion. An incomplete clamp transient fails to remove the correlated noise approximately in proportion to the degree of incompleteness. An incomplete sample transient attenuates the signal roughly in proportion to the degree of incompleteness. An incomplete transient of either clamp or sample circuit will produce also an effect whereby an abrupt transition will require two or more periods for the signal to attain its final value, an obvious distortion.

Figure 8:
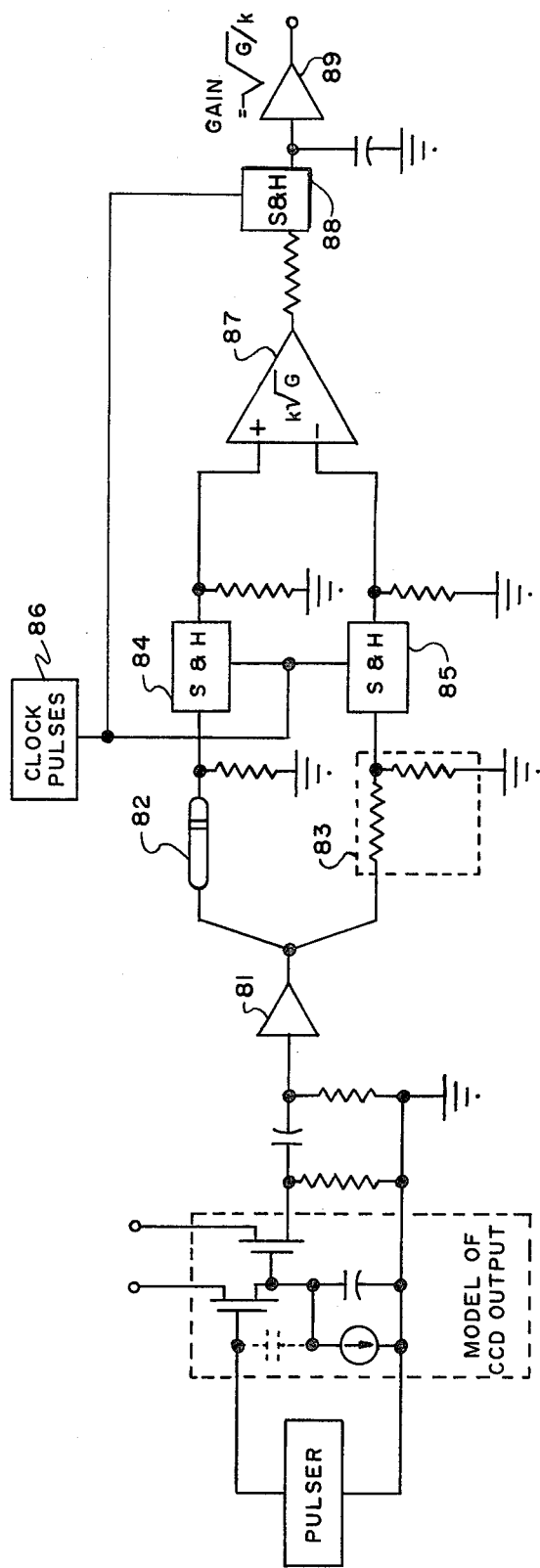
FIG. 8 shows a block diagram of a correlated double sampling video processor and amplifier according to the present invention.

FIG. 8 shows an improved circuit according to the present invention. The CCD output model is shown as a two transistor type although it is obvious that it will work with types having balanced outputs. The low gain high current buffer/driver 81 is capacitively coupled to the output of the CCD. A type LH 0002 IC amplifier, for example, may be used for this element. The output of this amplifier is fed to two nearly identical channels. The input of one channel has a delay line 82, while the input of the second channel has only an attenuator 83. Each channel has a sample-and-hold circuit 84 and 85 for example a DATEL Model SHM-UM, operating from the same source of clock pulses 86. The output of each channel is fed to one input of a differential amplifier 87. In some cases a midstage sample-and-hold 88 may be included at the output of the differential amplifier Sample and Hold circuit 88 is operated in synchronism with circuits 84 and 85. A high gain amplifier 89 can also be coupled to the output of the midstage S&H. The total circuit gain G is divided between these two amplifier elements in some optimal manner as before. By designing the front end sample-and-hold (S/H) circuits to be near identical as possible and strobing them simultaneously, a large common mode attenuation of the S/H switching transients (glitches) is achieved. The attenuator compensates for the small loss in the delay line and the slight difference in effective gain between the two input S/H circuits. The attenuator would likely be made adjustable in a laboratory prototype. Experimentally, it may turn out that a slightly unbalanced condition yields the best overall signal to noise. Ideally, the aperture time of the S/H circuit will be short enough to be fitted into the reference level interval or the video step interval without overlapping the capacitively coupled reset pulse or the reference-to-video transition. It is very probable that minor transients will occur within the aperture time, however, positioned; these transients delayed channel relative to undelayed channel, are likely to be significantly different. To the extent that these transients are independent of the video signal and recur regularly each period, the S/H circuits will rectify them into an equivalent DC voltage. The rectified transient equivalent DC voltage simply adds to the DC offsets inherently present in the input S/H circuits and the differential amplifier. Differential amplifiers are readily available which provide means to eliminate or control the DC offset.

The input S/H with delay is strobed to acquire the reference level; the input S/H without delay, simultaneously strobed, acquires the video step within the same basic period. It is realistic to identify eight component parts potentially present in the output signal from the differential amplifier.

1. The reset noise originating in the gated integrator: By virtue of perfect correlation between the reference level and the video step, this noise will be eliminated.

Two sources of coherent interference may require further suppression; they are the reason for the third or midstage S/H circuit 88, omitted if not necessary.

2. Unbalanced feedthrough from the input S/H circuits.

3. Incompletely cancelled S/H circuit switching transients or "glitches."

The following sources of noise and incoherent interference are reduced by correlated double sampling:

4. Thermal noise and 1/f noise originating within the source follower.

5. Thermal noise and 1/f noise originating within the buffer/driver.

6. Power supply hum and other interference picked up by the front end of the video processor.

The following are passed through the differential amplifier with full gain:

7. Pixel-by-pixel boxcar video and its accompanying uncorrelated noise.

8. Thermal noise and 1/f noise originating within the input S/H circuits.

The main advantages of the present invention are speed (wider bandwidth) and noise reduction.

The principal advantage is speed. It requires approximately the same length of time to perform a switched clamp operation as it does to perform a sample and hold operation, the transients being allowed to proceed to near completion in both cases. Simultaneous sampling of the signal delayed and undelayed as an alternative to the clamp-then-sample sequence, produces the same end result, and can attain at least twice the speed of the two step sequence. It is always sound engineering practice to minimize the amount of noise and interference present in a system. The claim remains true even when, in principle, the noise and interference can be removed by subsequent filtering and processing. Nonlinearites, be they subtle or gross, are ever present in real systems. These nonlinearities cause "noise" modulation of the signal, approximately in proportion to the amount of "noise" present; henceforth, the damage cannot be undone by any amount of subsequent filtering or processing.

A S/H circuit performs roughly as a low-pass filter; a switched clamp circuit performs roughly as a high-pass filter. For equal switching rates, the bandwidth of the clamp is much larger than that of the S/H circuit. If, as is typically the case, the bandwidth of the amplifier between the clamp and the sampler is significantly wider than the bandwidth of the S/H circuit itself, all else equal, the noise modulation will be reduced by replacing the clamp circuit by a S/H circuit. The invention replaces the clamp circuit with a S/H circuit.

The scheme of FIG. 8 is superior to those of FIG. 5 through FIG. 7 in the following way: The unwanted signal components, capacitively coupled pulses, switching glitches, and thermal noise, are all significantly reduced prior to the first gain block. The requirement for a balanced system, both electronically balanced and mechanically balanced (layout and connections), is restricted to the S/H circuits themselves and connections from them to the inputs of the differential amplifier. This requirement for symmetry is very much easier to satisfy than one which involves the primary sensor and the connections to it, as for example, the scheme of FIG. 6. As operating frequencies of CCDs increase there is no need to develop both a fast S/H circuit and a fast switched clamp: a savings in engineering and design effort. The circuit is described for use with gated integrator output configurations, but it also may be used with other types such as floating gate amplifiers. The delay provided by delay line 82 in FIG. 8 amounts to a fraction of one readout period for a charge packet from the CCD output. Some latitude is permissible as long as one S&H circuit samples a reference interval 42 of FIG. 4 while the other samples a video interval 44. A good delay parameter is thus the shortest time between the centers of two successive reference and video intervals. In this arrangement the S&H circuits may have equal apertures and be strobed simultaneously, the aperture being selected to remain within the shorter interval, usually the reference level interval.

Many variations of the above described circuitry will be readily apparent to those skilled in the art, but the invention is to be limited only as defined in the claims which follow.

I claim:

1. In combination with a charged couple device (CCD) having a periodic gated output a low level signal preprocessor comprising:
a source of clock pulses having a preselected sampling frequency;
a pair of sample-and-hold (S&H) circuits, each having a signal input, a clock input, an output and substantially equal signal gain characteristics, with their clock inputs coupled to and synchronized with said source and having their signal inputs each coupled to the output of the CCD;

a delay line means having a specific insertion loss and coupled in series with a first of said S&H circuits to delay the signal therein by a fraction of a cycle of said sampling frequency;

an attenuator means coupled in series with the second of said S&H circuits to attenuate the signal in said second S&H circuit by an amount equal to the insertion loss of said delay line means; and a single output circuit coupled to the outputs of both of said S&H circuits.

2. The combination according to claim 1 wherein said output circuit further includes:

a differential amplifier having inverting and noninverting inputs and an output, the outputs of said sample and hold circuits being each coupled to a different one of the inverting and noninverting inputs of said amplifier.

3. The combination according to claim 2 further including:

a third S&H circuit having a clock input coupled to said source and a signal input coupled to said output of said differential amplifier.

4. The combination according to claims 1, 2, or 3 wherein:

said S&H circuits have a sampling period less than the output gating period of said CCD.

5. The combination according to claims 1, 2, or 3 wherein:

said delay line means and said attenuator means are coupled to said CCD by means of a low gain ac coupled buffer amplifier.

6. The combination according to claim 3 wherein:

the output of said third S&H circuit is coupled to the input of a second high-gain amplifier.

* * * * *